T. J. NASH.
STEERING GEAR ATTACHMENT.
APPLICATION FILED APR. 5, 1915.
1,203,900.
Patented Nov. 7, 1916.
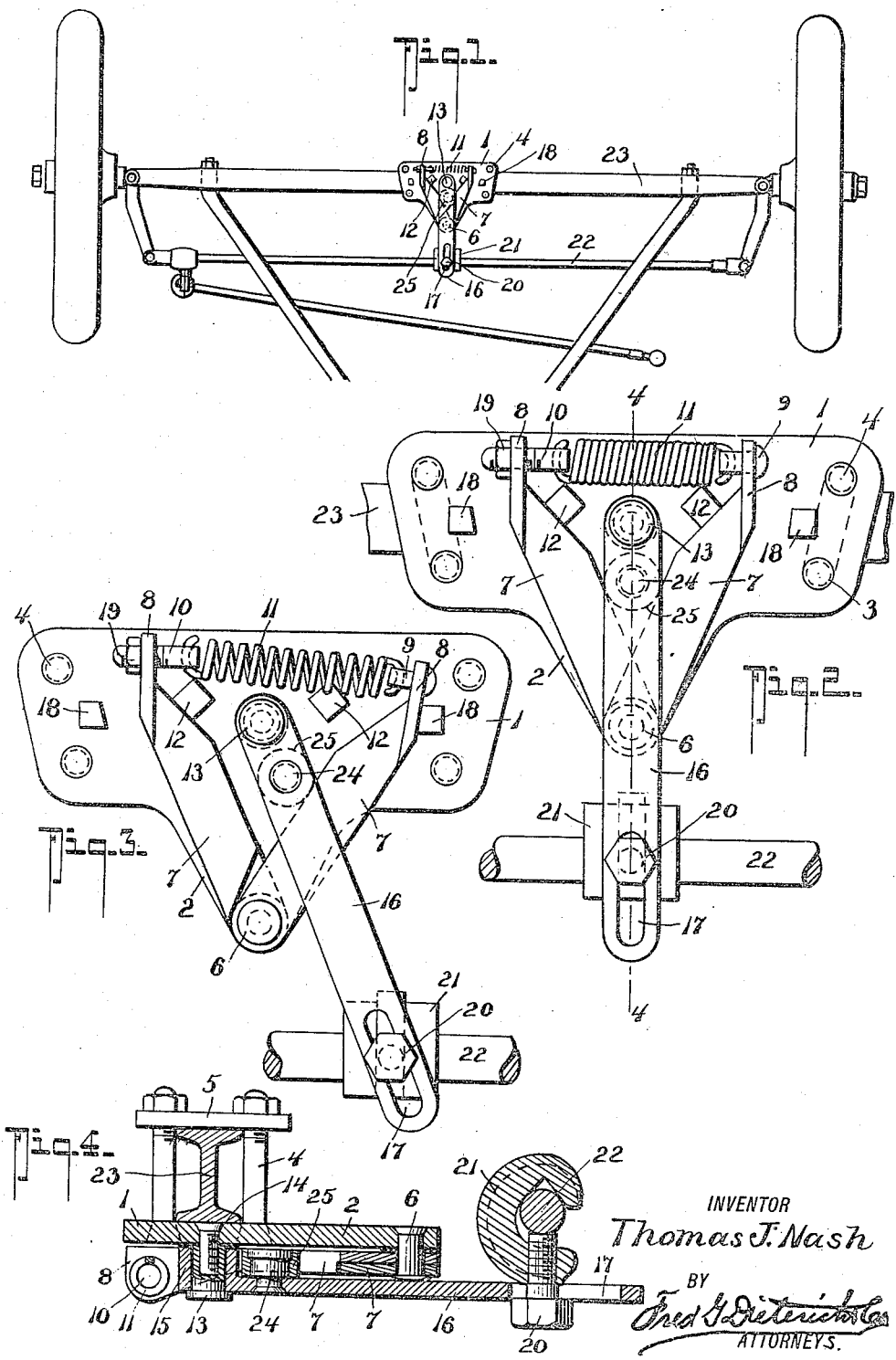
INVENTOR
Thomas J. Nash
BY
Fred G. Dieterich & Co.
ATTORNEYS.

UNITED STATES PATENT OFFICE.

THOMAS J. NASH, OF LINCOLN, NEBRASKA, ASSIGNOR TO AMERICAN ALUMINUM WARE COMPANY, OF LINCOLN, NEBRASKA.

STEERING-GEAR ATTACHMENT.

1,203,900.

Specification of Letters Patent.

Patented Nov. 7, 1916.

Application filed April 5, 1915. Serial No. 19,254.

*To all whom it may concern:*

Be it known that I, THOMAS J. NASH, residing at Lincoln, in the county of Lancaster and State of Nebraska, have invented certain new and useful Improvements in Steering-Gear Attachments, of which the following is a specification.

My invention relates to certain new and useful improvements in attachments for steering gears of automobiles and the like, the object of the invention being to provide a simple, inexpensive and effective device which, when attached to the machine on the front axle and connected to the connecting rod between the steering knuckles, will hold the machine in a straight course and which will allow the steering wheel to be turned in either direction without increased effort.

A further object of the invention is to provide such a device so designed and constructed that whenever the machine is steered in either direction, the tension on the steering gear is equalized so that the pull is practically the same throughout the entire radius of movement.

In its generic nature, the invention resides in providing a plate securable to the axle of the vehicle, on which plate there is pivoted a pair of buffer levers having a spring tension connection continuously drawing them together within predetermined limits, and an operating lever also pivoted to the plate and to the connecting rod of the steering mechanism, the operating lever having operative engagement with the buffer levers at a place located between the pivots of the operating lever and the buffer levers and so engaging the buffer levers as to increase the leverage exerted by the operating lever proportionately to the arc of movement of the levers to equalize the increased tension exerted by the buffer lever drawing spring.

More subordinately, the invention includes those novel features of construction, combination and arrangement of parts, all of which will be first fully described, then be specifically pointed out in the appended claims, and illustrated in the accompanying drawings, in which:

Figure 1 is an inverted plan view of the front axle and a part of the steering mechanism of an automobile. Fig. 2 is an enlarged inverted plan view of the device which forms the subject-matter of the present invention, a portion of the connecting rod of the automobile being indicated, the parts being in the normal or straightway position. Fig. 3 is a view similar to Fig. 2 showing the connecting rod as moved to one side in turning and the operating lever and one of the buffer levers moved in consequence thereof. Fig. 4 is a section on the line 4—4 of Fig. 2.

In the drawing, in which like numerals of reference indicate like parts in all of the figures, 1 is the base plate which is provided with an extension 2 that extends rearwardly toward the connecting rod 22 of the steering mechanism. The plate 1 is designed to be secured to the front axle 23 by bolt, clamp and nut devices 4—5 or other suitable means.

6 designates what I term, for convenience of description, the buffer lever pivot stud which is carried by the extension 2 of the plate and on which the buffer levers 7 are pivoted. The levers 7 diverge forwardly from the pivot 6 and have ears 8 that carry the spring connection members 9 and 10, between which the buffer spring 11 is located, the ends of the spring being secured to the members 9 and 10. For purpose of adjustment, one of these members (10) may be threaded and provided with a nut 19 in order that the tension of the spring 11 may be regulated.

12 are the limiting stops which prevent the spring 11 from drawing the levers 7 together beyond a predetermined position and 18 are the limiting stops which prevent the too far separation of the levers 7.

13 is what I term the operating lever pivot lug which is secured at 14 to the plate 1 in substantial alinement with the plane of location of the axle 23, in the preferred construction, and on the pivot 13 is fulcrumed the operating lever 16, the lever lying under the levers 7 and having a boss 15 to form a bearing on the lug 13. The lever 16 has a slotted end 17 through which the clamp pivot screw 20 is passed, the screw 20 forming a coöperative part of the clamp 21, by means of which the desired connection with the connecting rod 22 is effected.

24 is a stud which is carried by the operating lever 16 and is located at a position between the pivots 6 and 13, the stud 24 being provided with a roller 25 that is designed to lie in contact with both levers 7 when such levers are in engagement with lugs 12 and thus hold the lever 16 in alinement with the pivots 6 and 13.

In practice, when the vehicle is directed forwardly the parts will be positioned as shown in Figs. 1 and 2, but when the vehicle is turned to one side or the other, the parts will assume a position such, for instance, as shown in Fig. 3, but with the lever 16 moved to the right or left, as the case may be. It will be observed that a line drawn from the point of contact of the roller 25 with the levers 7 and the center of the pivot 6 is less when the parts are in the normal position than when the lever 16 is swung to one side as, for instance, in Fig. 2. This enables the leverage to be increased progressively as the lever 16 is turned on its pivot from the normal or straight road position proportionately to the added tension encountered by the separation of the ends of the levers 7 and the extension of the spring 11 thereby equalizing, to a considerable degree at least, the tension exerted and enabling the vehicle to be steered freely without exerting much more tension (if any more) on the turn than is present at the commencement of the turn, or in the normal running position.

From the foregoing description taken in connection with the accompanying drawings, it is thought the complete construction, advantages and simplicity of the invention will be readily apparent to those skilled in the art.

What I claim is:—

1. In a steering mechanism attachment, a plate, means for securing the same to the axle of a vehicle, an operating lever pivoted to the plate, means for securing said lever to the connecting rod of the steering mechanism of a vehicle, a pair of buffer levers pivoted to said plate, a stud on said operating lever located at a place between the pivot locations of said operating lever and of said buffer levers a spring for holding said buffer levers against said stud, and stops for limiting the movement of said buffer levers.

2. In a steering mechanism attachment, a plate, clamps to secure said plate on a vehicle axle, an operating lever pivot stud secured to the plate, an operating lever pivoted on said stud and projecting beyond said plate, a device for connecting said operating lever to the connecting rod of the steering mechanism of a vehicle, a pair of buffer levers, a buffer lever pivot stud on said plate, a stud on said operating lever to engage said buffer levers and located between the pivotal points of said operating lever and of said buffer levers and stops for limiting the movement of said buffer levers.

3. In a steering mechanism attachment, a plate, clamps to secure said plate on a vehicle axle, an operating lever pivot stud secured to the plate in alinement with the place of location of the vehicle axle, an operating lever pivoted on said stud and projecting beyond said plate, a device for connecting said operating lever to the connecting rod of the steering mechanism of a vehicle, a pair of buffer levers, a buffer lever pivot stud on said plate, located to one side of the place of axle location, a stud on said operating lever to engage said buffer levers and located between the pivotal points of said operating lever and of said buffer levers, and stops for limiting the movement of said buffer levers.

4. A steering mechanism attachment comprising a plate, elements by means of which said plate may be secured in position, a pair of buffer levers pivoted to said plate and diverging from the point of pivot, a spring connecting the ends of said levers together, stops for limiting the approaching movement of the ends of said levers, an operating lever pivoted to said plate between the ends of said buffer levers, a stud on said operating lever to engage said buffer levers, and a device for connecting the end of said operating lever to the connecting rod of a steering mechanism.

5. A steering mechanism attachment comprising a plate, elements by means of which said plate may be secured in position, a pair of buffer levers pivoted to said plate and diverging from the point of pivot, a spring connecting the ends of said levers together, stops for limiting the approaching movement of the ends of said levers, an operating lever pivoted to said plate between the ends of said buffer levers, a stud on said operating lever to engage said buffer levers, a device for connecting the end of said operating lever to the connecting rod of a steering mechanism, and a device for adjusting the tension of said spring.

6. A steering mechanism attachment comprising a plate, elements by means of which said plate may be secured in position, a pair of buffer levers pivoted to said plate and diverging from the point of pivot, a spring connecting the ends of said levers together, stops for limiting the approaching movement of the ends of said levers, other stops for limiting the separating movement of said levers, an operating lever pivoted to said plate between the ends of said buffer levers, a stud on said operating lever to engage said buffer levers, and a device for connecting the end of said operating lever to the connecting rod of a steering mechanism.

THOMAS J. NASH.

Copies of this patent may be obtained for five cents each, by addressing the "Commissioner of Patents, Washington, D C."